United States Patent [19]
Toki et al.

[11] Patent Number: 6,089,175
[45] Date of Patent: Jul. 18, 2000

[54] WAVE-ABSORBING TYPE LARGE FLOATING STRUCTURE

[75] Inventors: Naoji Toki; Makoto Ohta; Masahiko Ozaki; Junichi Minamiura, all of Nagasaki, Japan

[73] Assignee: Mitsubishi Heavy Industries, Ltd., Tokyo, Japan

[21] Appl. No.: 09/349,152

[22] Filed: Jul. 8, 1999

Related U.S. Application Data

[63] Continuation of application No. 08/974,338, Nov. 19, 1997, abandoned.

[30]  Foreign Application Priority Data

Nov. 27, 1996 [JP] Japan ................................. 8-331627

[51] Int. Cl.[7] .................................................. B63B 35/44
[52] U.S. Cl. ........................................... 114/264; 405/27
[58] Field of Search .................................. 114/264, 265, 114/266, 121, 124, 125; 405/27

[56] References Cited

U.S. PATENT DOCUMENTS

| | | | |
|---|---|---|---|
| 2,488,542 | 11/1949 | Houghtaling | 114/264 |
| 3,299,846 | 1/1967 | Jarlan | 114/264 |
| 3,952,521 | 4/1976 | Potter | 405/27 |
| 4,225,268 | 9/1980 | Treu | 405/27 |
| 4,836,709 | 6/1989 | Ploeg et al. | 405/27 |

FOREIGN PATENT DOCUMENTS

| | | | |
|---|---|---|---|
| 75111 | 4/1986 | Japan | 405/27 |
| 7-323884 | 12/1995 | Japan . | |

*Primary Examiner*—Stephen Avila
*Attorney, Agent, or Firm*—Trop, Pruner & Hu, P.C.

[57] ABSTRACT

The present invention relates to a large floating structure used for a marine airport and the like and, more particularly, to a large floating structure in which the large floating structure itself has a wave absorbing function, whereby the need for a breakwater etc. is eliminated, and the installation of a separate wave absorbing structure at the outer periphery of the large floating structure is not needed, whereby an upper deck can be utilized effectively. For this purpose, under an extending portion on the up-wave side of the upper deck of large floating structure, for example, many box-shaped floating bodies arranged in a zigzag form and lattice-shaped connecting members are provided as a wave absorbing structure depending from the extending portion.

6 Claims, 13 Drawing Sheets

F I G. 5A
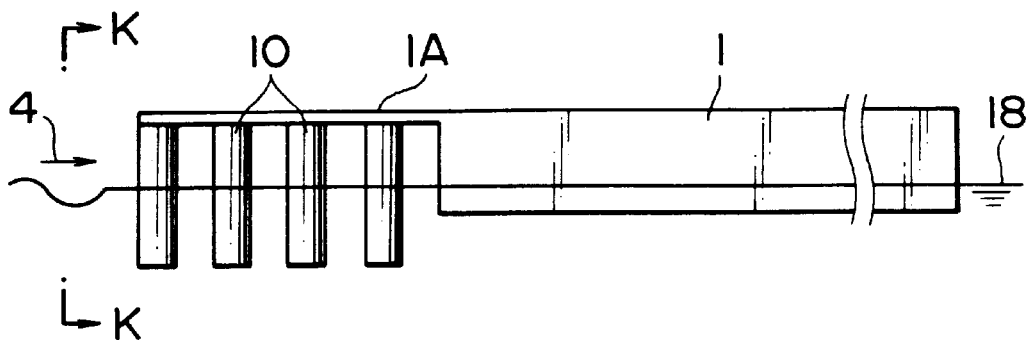
F I G. 5B
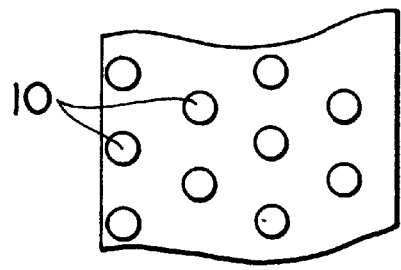
F I G. 5C
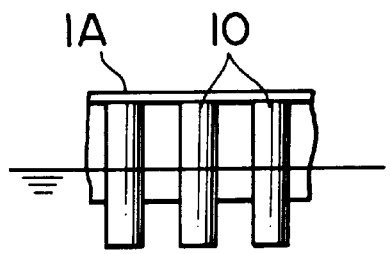

F I G. 12A
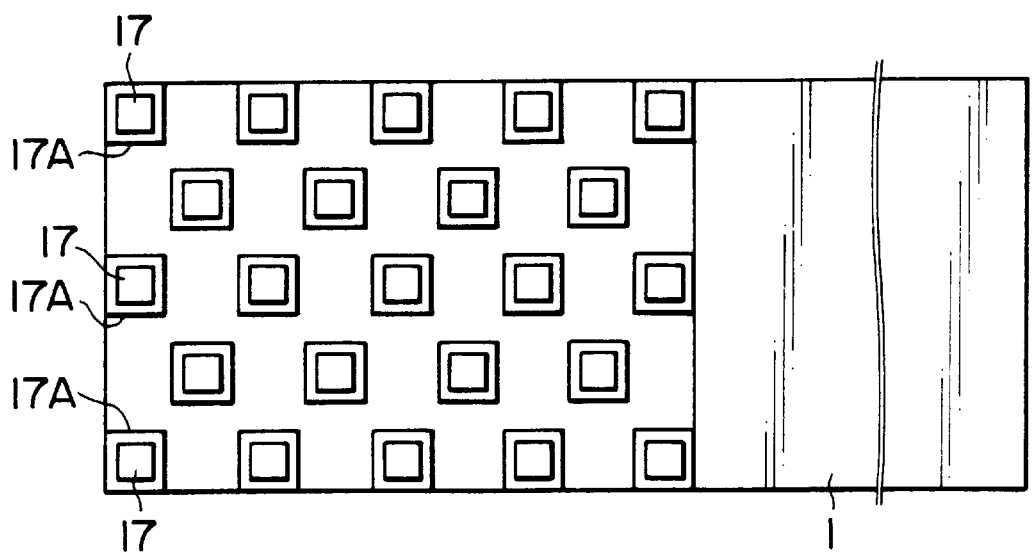
F I G. 12B
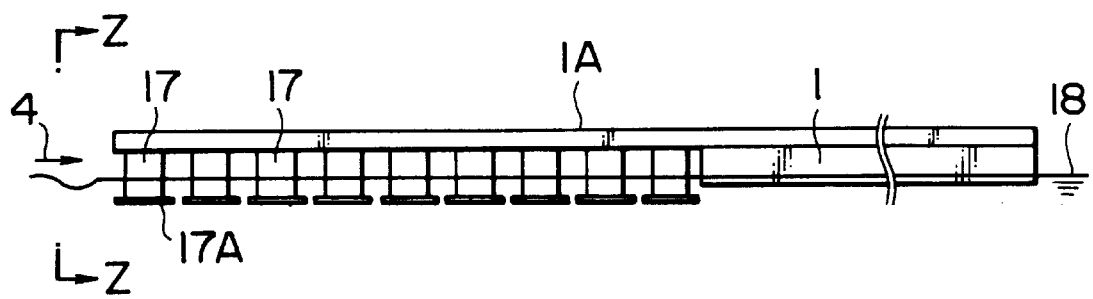
F I G. 12C
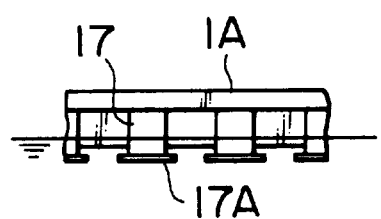

WAVE-ABSORBING TYPE LARGE FLOATING STRUCTURE

This application is a continuation of U.S. patent application Ser. No. 08/974,338, filed Nov. 19, 1997 now abandoned.

FIELD OF THE INVENTION AND RELATED ART STATEMENT

The present invention relates to a large floating structure used for a marine airport (including a marine heliport), marine plant barge, marine city, and the like.

Although there exists a small box-shaped floating structure installed in a calm sea zone such as a bay, which are used as a restaurant barge, amusement center, and the like, a large floating structure one side of whose upper deck has a length on the order of several kilometers has not been built at present. However, many marine airports and marine cities are now being planned. The main construction type thereof is such that a calm sea zone is formed by installing a breakwater 18a passing through a water surface 18 so as to be capable of shutting off incident waves 4 and a large floating structure 1 is installed in this calm sea zone as shown in FIG. 13.

The large floating structure exhibits a complicated deformation response according to waves because it has a small thickness as compared with the length thereof. The deformation increases with increasing wave height. If there is no breakwater around the floating structure, problems of slamming due to the exposure of bottom plate, overtopping, etc. are caused. Also, the fixed breakwater for forming the calm sea zone requires a huge installation cost when the water depth is great.

A floating wave absorbing breakwater or wave absorbing structure may be provided at the outer periphery of the large floating structure. In this case, however, because a relatively moving structure exists around the large floating structure, such a wave absorbing structure obstructs ship's approaching and cargo handling work, or it is difficult to use the space above the wave absorbing structure.

OBJECT AND SUMMARY OF THE INVENTION

Accordingly, an object of the present invention is to provide a wave-absorbing type large floating structure in which the large floating structure itself has a wave absorbing function, by which the need for fixed breakwater is eliminated, and no obstacle exists close to the outer periphery of an upper deck of the large floating structure, by which the upper deck can be utilized effectively and ship's approach can be facilitated.

To achieve the above object, the present invention provides a wave-absorbing type large floating structure having a large upper deck, in which an extending portion of the upper deck extending to the up-wave side is provided with a wave absorbing structure depending from the extending portion so as extend to a level under water by passing through a water level.

In the above-described wave-absorbing type large floating structure in accordance with the present invention, a wave absorbing structure depending from the extending portion so as to extend to a level under water is provided under the upper deck extending portion extending to the up-wave side, so that the large floating structure itself has a wave absorbing function. Therefore, an expensive fixed breakwater or floating breakwater for forming a calm sea zone is not needed.

Also, since there is no wave absorbing structure that is arranged close to the outer periphery of the upper deck and moves relatively, ship's approach is facilitated, and also the space on the upper deck including the peripheral portion thereof can be utilized effectively.

In the case where the wave absorbing structure depending from the upper deck extending portion is configured by many box-shaped floating bodies depending from the upper deck extending portion with spaces formed therebetween in the horizontal direction and lattice-shaped connecting members for connecting the box-shaped floating bodies to each other, the buoyancy of many box-shaped floating bodies serves as part of the buoyancy of the large floating structure, and also the incident waves invading from the up-wave side are broken by the box-shaped floating bodies and lattice-shaped connecting members disposed between the box-shaped floating bodies, so that the wave height is decreased as the wave advances to the down-wave side.

When the box-shaped floating boxes are arranged in a zigzag form, the incident waves are broken more efficiently.

In the case where the wave absorbing structure is configured so that a plurality of box-shaped floating bodies depending from the upper deck extending portion are provided so as to extend long in the wave advance direction with spaces formed therebetween, the incident waves invading from the up-wave side are damped, so that the wave height is decreased, as the incident waves advance along the tunnel-shaped spaces between the long box-shaped floating bodies depending from the upper deck extending portion.

In the case where the inclined plates are provided between the long box-shaped floating bodies so as to rise gradually in the wave advance direction, when the incident waves invading from the up-wave side advance along the spaces between the long box-shaped floating bodies, the incident waves are damped while rising on the inclined plates, so that the wave height is decreased.

When many protrusions are provided on the upper surface of the inclined plate, the incident waves are broken by the protrusions while rising along the inclined plates and damped efficiently, so that the wave height is decreased.

In the case where void forming fillers supported by supporting means installed to the box-shaped floating bodies are provided in the spaces between the box-shaped floating bodies, the incident waves invading the spaces between the box-shaped floating bodies are efficiently broken by the void forming fillers formed of large quantities of wire nets or many wave absorbing blocks having protrusions, so that the wave energy is absorbed.

In the case where the wave absorbing structure is configured so that a plurality of T-shaped wave absorbers are formed of many vertical plates depending from the upper deck extending portion so as to extend in parallel in the wave advance direction and tip end extending members each connected to the up-wave end of the vertical plate and extending to both sides of the vertical plate, the incident waves are broken by the T-shaped wave absorbers each consisting of the vertical plate extending in the wave advance direction and the tip end extending member on the up-wave side of the vertical plate. Therefore, the wave height of the incident wave is decreased sufficiently before the incident wave reaches the body of the large floating structure.

Also, in the case where the wave absorbing structure is configured by a plurality of columnar members depending from the upper deck extending portion in a zigzag form, the incident waves are scattered by many of the cylindrical or prismatic columnar members arranged in a zigzag form, so that the wave height is decreased.

When the columnar members are formed so as to have a horizontal cross section of an X shape, the incident waves are scattered more efficiently by the columnar members, so that the wave height is decreased significantly.

In the case where a footing member forming a lower surface larger than the horizontal cross section of the columnar member is provided at the lower end of the columnar member, the incident waves are scattered and broken sufficiently by the cooperation of the columnar members arranged in a zigzag form and the footing members at the lower ends thereof, and also the effect that a floating motion can be restrained by the added mass of the footing members is achieved.

In the case where the wave absorbing structure is configured by a plurality of end plates depending from the upper deck extending portion so as to extend perpendicularly to the wave advance direction with spaces formed therebetween, the incident waves invading from the up-wave side are damped while being reflected successively by the plural end plates, passing under the end plates, so that the wave height is decreased successively.

In the case where the wave absorbing structure is configured by a plurality of horizontal plates arranged in a multistep shape so that the level thereof is successively raised in the wave advance direction and side support members depending from the upper deck extending portion so as to support both sides of the horizontal plates, the incident waves are broken and damped by the multistep shaped horizontal plates whose level is raised successively so that the motion of wave particle is destroyed. Therefore, when the incident waves reach the body of the large floating structure, the wave height is decreased.

When the horizontal plate is formed of a perforated plate, the wave particle motion of the incident wave is destroyed more efficiently, so that the wave height is decreased sufficiently.

As described above, the wave-absorbing type large floating structure in accordance with the present invention can achieve the following effects:

(1) Since a wave absorbing structure depending from the extending portion so as to extend to a level under water is provided under the upper deck extending portion extending to the up-wave side, so that the large floating structure itself has a wave absorbing function. Therefore, an expensive fixed breakwater or floating breakwater for forming a calm sea zone is not needed. Also, since there is no wave absorbing structure that is arranged close to the outer periphery of the upper deck and moves relatively, ship's approach is facilitated, and also the space on the upper deck including the peripheral portion thereof can be utilized effectively.

(2) In the case where the wave absorbing structure depending from the upper deck extending portion is configured by many box-shaped floating bodies depending from the upper deck extending portion with spaces formed therebetween in the horizontal direction and lattice-shaped connecting members for connecting the box-shaped floating bodies to each other, the buoyancy of many box-shaped floating bodies serves as part of the buoyancy of the large floating structure, and also the incident waves invading from the up-wave side are broken by the box-shaped floating bodies and lattice-shaped connecting members disposed between the box-shaped floating bodies, so that the wave height is decreased as the wave advances to the down-wave side.

(3) When the box-shaped floating boxes are arranged in a zigzag form, the incident waves are broken more efficiently.

(4) In the case where the wave absorbing structure is configured so that a plurality of box-shaped floating bodies depending from the upper deck extending portion are provided so as to extend long in the wave advance direction with spaces formed therebetween, the incident waves invading from the up-wave side are damped, so that the wave height is decreased, as the incident waves advance along the tunnel-shaped spaces between the long box-shaped floating bodies depending from the upper deck extending portion.

(5) In the case where the inclined plates are provided between the long box-shaped floating bodies so as to rise gradually in the wave advance direction, when the incident waves invading from the up-wave side advance along the spaces between the long box-shaped floating bodies, the incident waves are damped while rising on the inclined plates, so that the wave height is decreased.

(6) When many protrusions are provided on the upper surface of the inclined plate, the incident waves are broken by the protrusions while rising along the inclined plates and damped efficiently, so that the wave height is decreased.

(7) In the case where void forming fillers supported by supporting means installed to the box-shaped floating bodies are provided in the spaces between the box-shaped floating bodies, the incident waves invading the spaces between the box-shaped floating bodies are efficiently broken by the void forming fillers formed of large quantities of wire nets or many wave absorbing blocks having protrusions, so that the wave energy is absorbed.

(8) In the case where the wave absorbing structure is configured so that a plurality of T-shaped wave absorbers are formed of many vertical plates depending from the upper deck extending portion so as to extend in parallel in the wave advance direction and tip end extending members each connected to the up-wave end of the vertical plate and extending to both sides of the vertical plate, the incident waves are broken by the T-shaped wave absorbers each consisting of the vertical plate extending in the wave advance direction and the tip end extending member on the up-wave side of the vertical plate. Therefore, the wave height of the incident wave is decreased sufficiently before the incident wave reaches the body of the large floating structure.

(9) Also, in the case where the wave absorbing structure is configured by a plurality of columnar members depending from the upper deck extending portion in a zigzag form, the incident waves are scattered by many of the cylindrical or prismatic columnar members arranged in a zigzag form, so that the wave height is decreased.

(10) When the columnar members are formed so as to have a horizontal cross section of an X shape, the incident waves are scattered more efficiently by the columnar members, so that the wave height is decreased significantly.

(11) In the case where a footing member forming a lower surface larger than the horizontal cross section of the columnar member is provided at the lower end of the columnar member, the incident waves are scattered and broken sufficiently by the cooperation of the columnar members arranged in a zigzag form and the footing members at the lower ends thereof, and also the effect that a floating motion can be restrained by the added mass of the footing members is achieved.

(12) In the case where the wave absorbing structure is configured by a plurality of end plates depending from the upper deck extending portion so as to extend perpendicularly to the wave advance direction with spaces formed therebetween, the incident waves invading from the up-wave side are damped while being reflected successively by the plural end plates, passing under the end plates, so that the wave height is decreased successively.

(13) In the case where the wave absorbing structure is configured by a plurality of horizontal plates arranged in a multistep shape so that the level thereof is successively raised in the wave advance direction and side support members depending from the upper deck extending portion so as to support both sides of the horizontal plates, the incident waves are broken and damped by the multistep shaped horizontal plates whose level is raised successively so that the motion of wave particle is destroyed. Therefore, when the incident waves reach the body of the large floating structure, the wave height is decreased.

(14) When the horizontal plate is formed of a perforated plate, the wave particle motion of the incident wave is destroyed more efficiently, so that the wave height is decreased sufficiently.

BRIEF DESCRIPTION OF THE DRAWINGS

FIG. 5(a) is a side view of a wave-absorbing type large floating structure in accordance of a fifth embodiment of the present invention, FIG. 5(b) is a bottom view of the principal portion thereof, and FIG. 5(c) is a view in the direction of the arrow K—K of FIG. 5(a);

FIG. 12(a) is a bottom view of a wave-absorbing type large floating structure in accordance of a twelfth embodiment of the present invention, FIG. 12(b) is a side. view thereof, and FIG. 12(c) is a view in the direction of the arrow Z—Z of FIG. 12(b)

DETAILED DESCRIPTION OF PREFERRED EMBODIMENTS

Figure 1A:
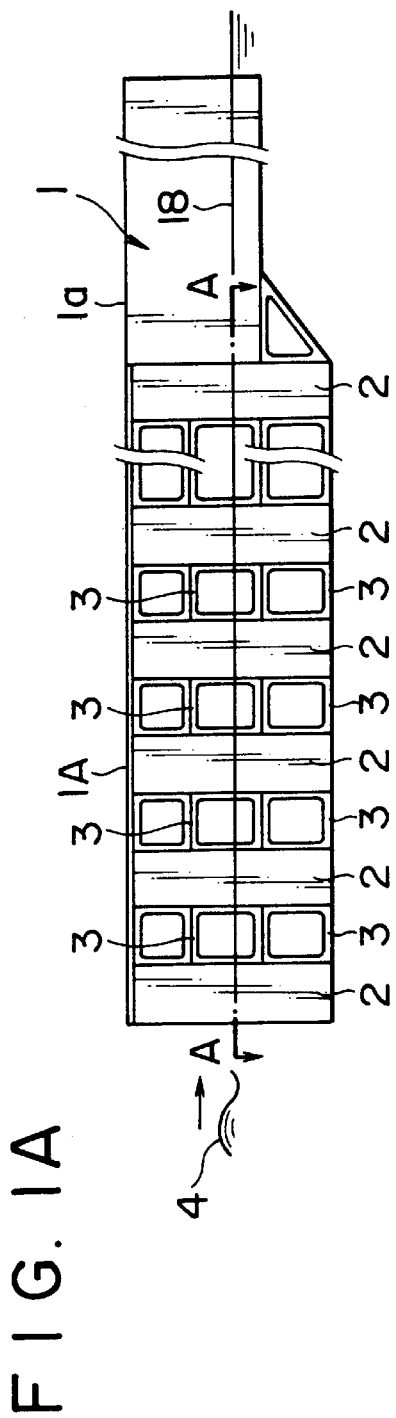
FIG. 1(a) is a side view of a wave-absorbing type large floating structure in accordance of a first embodiment of the present invention.

Embodiments of the present invention will now be described with reference to the accompanying drawings. FIG. 1(a) is a side view of a wave-absorbing type large floating structure in accordance of a first embodiment of the present invention, and FIG. 1(b) is a sectional view taken along the line A—A of FIG. 1(a).

Figure 1B:
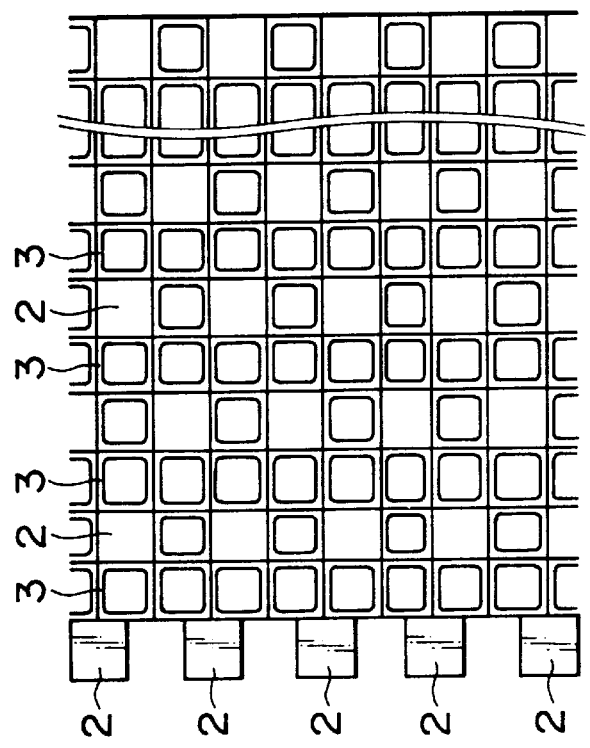
FIG. 1(b) is a sectional view taken along the line A—A of FIG. 1(a)

As shown in FIGS. 1(a) and 1(b), a large floating structure 1 has a large upper deck 1a, and on the large floating structure 1, an extending portion 1A of the upper deck 1a, which extends to the up-wave side of incident wave 4, is provided with a wave absorbing structure depending from the extending portion 1A. This wave absorbing structure is arranged so as to pass through a water surface 18 and extend to under water. The wave absorbing structure for the large floating structure 1 of this embodiment is provided with many box-shaped floating bodies 2 depending from the upper deck extending portion 1A and lattice-shaped connecting members 3 for connecting the box-shaped floating bodies 2 to each other.

A large number of the box-shaped bodies 2 are arranged in a zigzag form as shown in FIG. 1(b).

Figure 2A:
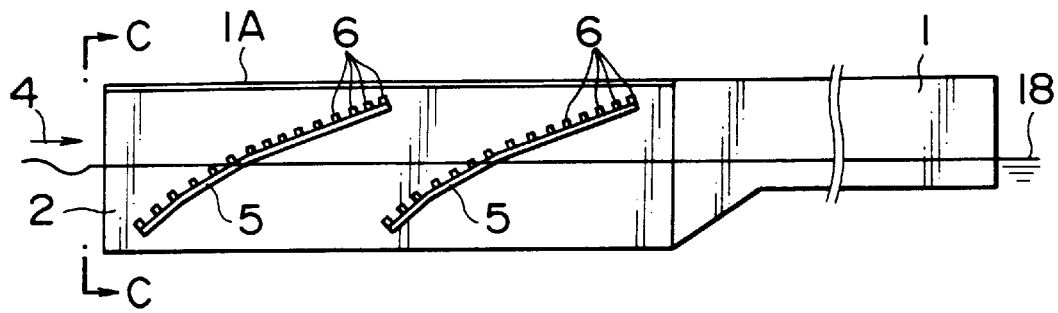
FIG. 2(a) is a longitudinal sectional view of a wave-absorbing type large floating structure in accordance of a second embodiment of the present invention, taken along the line B—B of FIG. 2(b)
Figure 2B:
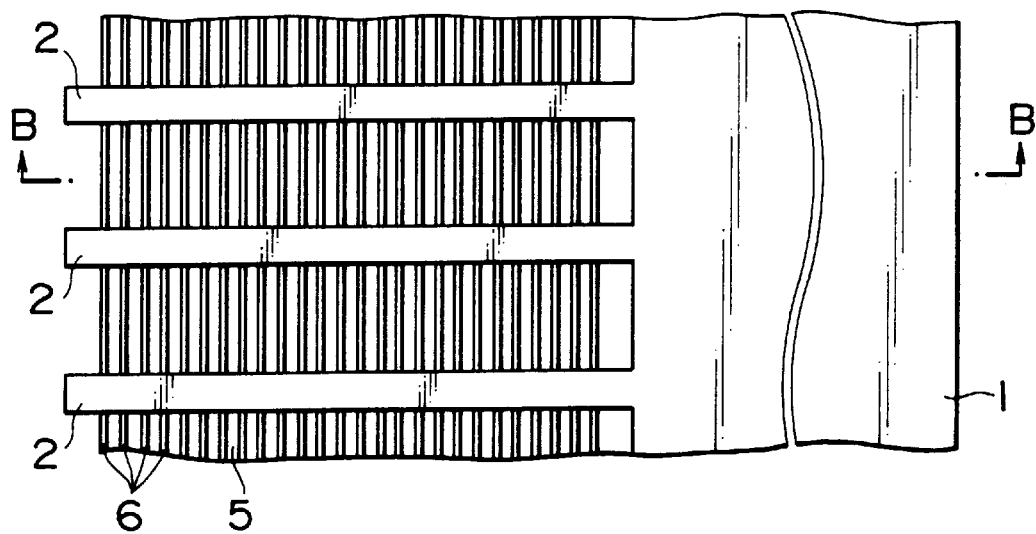
FIG. 2(b) is a horizontal sectional view thereof.
Figure 2C:
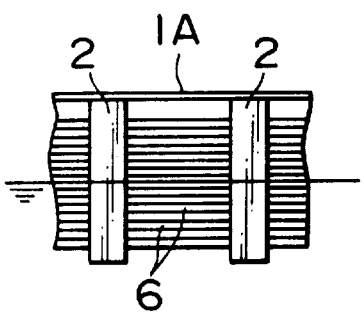
FIG. 2(c) is a view in the direction of the arrow C—C of FIG. 2(a)

FIG. 2(a) is a longitudinal sectional view of a wave-absorbing type large floating structure in accordance of a second embodiment of the present invention, taken along the line B—B of FIG. 2(b), FIG. 2(b) is a horizontal sectional view thereof, and FIG. 2(c) is a view in the direction of the arrow C—C of FIG. 2(a).

As shown in FIGS. 2(a), 2(b), and 2(c), a wave absorbing structure for a large floating structure 1 of the second embodiment is provided with a plurality of box-shaped floating bodies 2 depending from an upper deck extending portion 1A and inclined plates 5 interposed between the box-shaped floating bodies 2 so as to rise gradually in the advance direction of incident wave 4. The box-shaped floating bodies 2 extend long in the advance direction of incident wave 4 with spaces formed therebetween in the direction perpendicular to the advance direction of incident wave 4. Two inclined plates 5 are installed longitudinally in each space between the box-shaped floating boxes 2. The inclined plate 5 is formed so as to be slightly convex upward, and provided with many protrusions 6 on the upper surface thereof.

Figure 3A:
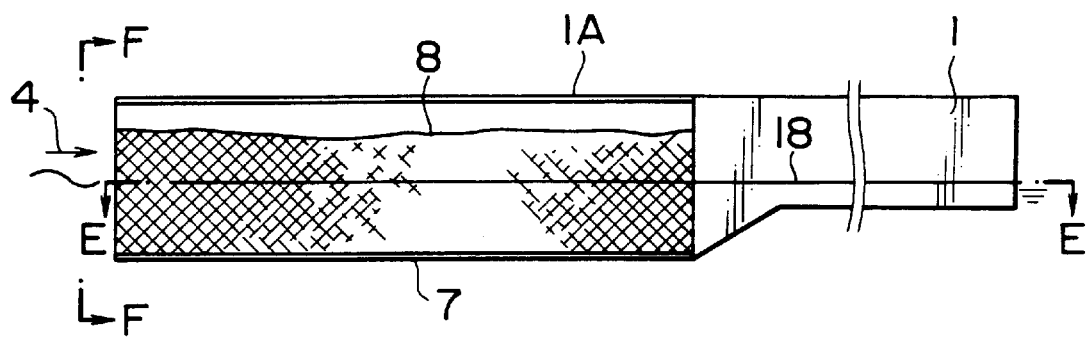
FIG. 3(a) is a longitudinal sectional view of a wave-absorbing type large floating structure in accordance of a third embodiment of the present invention, taken along the line D—D of FIG. 3(b)
Figure 3B:
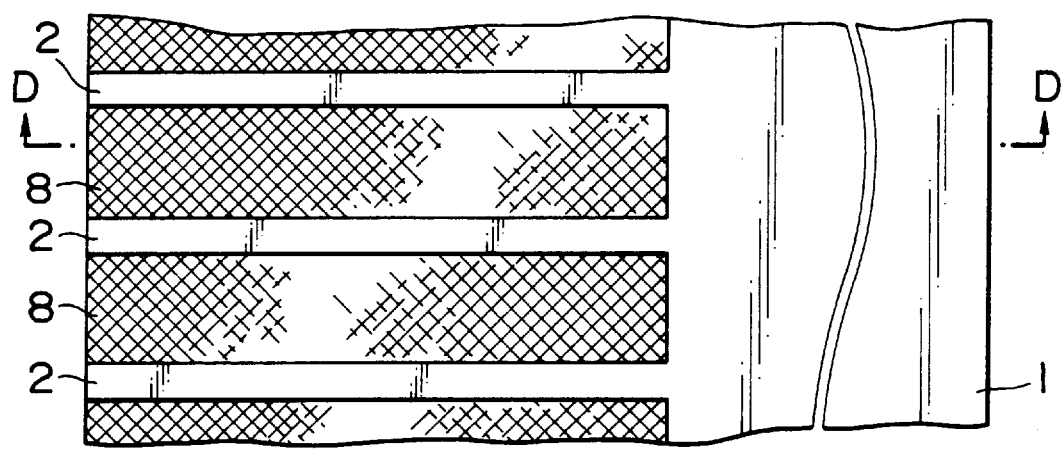
FIG. 3(b) is a sectional view taken along the line E—E of FIG. 3(a)
Figure 3C:
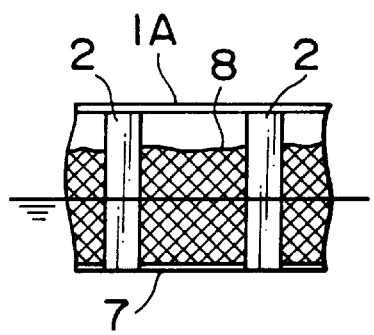
FIG. 3(c) is a view in the direction of the arrow F—F of FIG. 3(a)

FIG. 3(a) is a longitudinal sectional view of a wave-absorbing type large floating structure in accordance of a third embodiment of the present invention, taken along the line D—D of FIG. 3(b), FIG. 3(b) is a sectional view taken along the line E—E of FIG. 3(a), and FIG. 3(c) is a view in the direction of the arrow F—F of FIG. 3(a).

As shown in FIGS. 3(a), 3(b), and 3(c), a wave absorbing structure for a large floating structure 1 of the third embodiment has a plurality of box-shaped floating bodies 2 depending from an upper deck extending portion 1A. The box-shaped floating bodies 2 extend long in the advance direction of incident wave 4 with spaces formed therebetween in the direction perpendicular to the advance direction of incident wave 4. Between these box-shaped floating bodies 2, void forming fillers 8, which are supported by bottom plates 7 serving as supporting means installed to the box-shaped floating bodies 2, are provided. This filler 8 is formed of wire nets or wave absorbing blocks having protrusions. Although the bottom plates 7 for supporting the fillers 8 are installed between the adjacent box-shaped floating bodies 2 in this embodiment, a net-shaped member or lattice member may be used as supporting means for the fillers 8. Alternatively, the fillers 8 may be supported by a suitable protrusion type supporting means protruding from the box-shaped floating bodies 2 to the side.

Figure 4A:
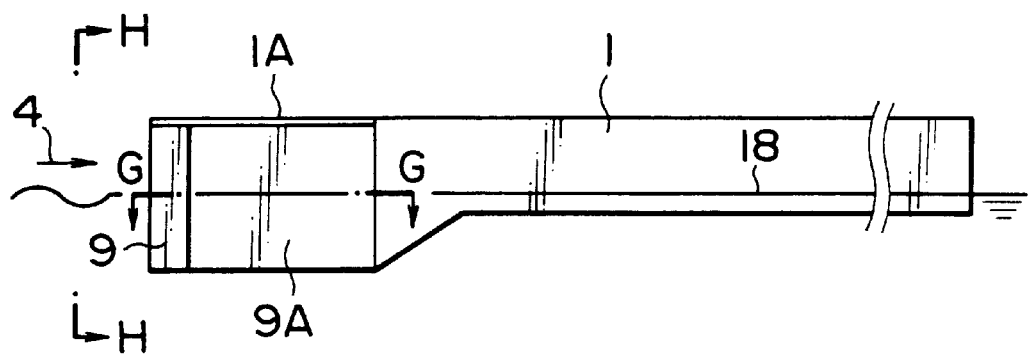
FIG. 4(a) is a side view of a wave-absorbing type large floating structure in accordance of a fourth embodiment of the present invention.
Figure 4B:
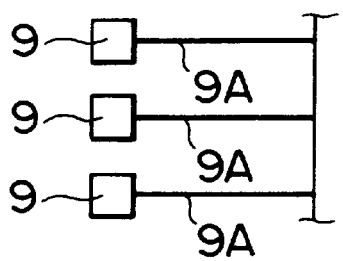
FIG. 4(b) is a sectional view taken along the line G—G of FIG. 4(a)
Figure 4C:
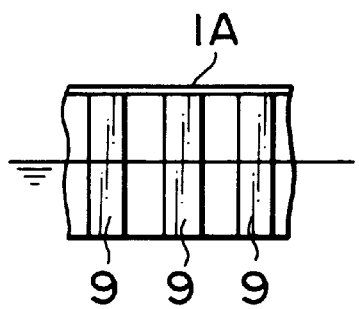
FIG. 4(c) is a view in the direction of the arrow H—H of FIG. 4(a)

FIG. 4(a) is a side view of a wave-absorbing type large floating structure in accordance of a fourth embodiment of the present invention, FIG. 4(b) is a sectional view taken along the line G—G of FIG. 4(a), and FIG. 4(c) is a view in the direction of the arrow H—H of FIG. 4(a).

As shown in FIGS. 4(a), 4(b), and 4(c), a wave absorbing structure for a large floating structure 1 of the fourth embodiment is provided with many vertical plates 9A which extend in parallel to each other in the advance direction of incident wave 4 so as to depend from an upper deck extending portion 1A to a level under a water surface 18.

At the tip end on the up-wave side of each vertical plate 9A, a tip end extending member 9 is provided as a floating body extending to both sides of the vertical plate 9A. Thus, many T-shaped wave absorbers are formed.

FIG. 5(a) is a side view of a wave-absorbing type large floating structure in accordance of a fifth embodiment of the present invention, FIG. 5(b) is a bottom view of the principal portion thereof, and FIG. 5(c) is a view in the direction of the arrow K—K of FIG. 5(a).

As shown in FIGS. 5(a), 5(b), and 5(c), a wave absorbing structure for a large floating structure 1 of the fifth embodiment has a plurality of circular cylinders 10 provided as columnar members depending from an upper deck extending portion 1A extending to the up-wave side to a level under water by passing through a water surface 18. These circular cylinders 10 are arranged in a zigzag form as shown in FIG. 5(b).

Figure 6A:
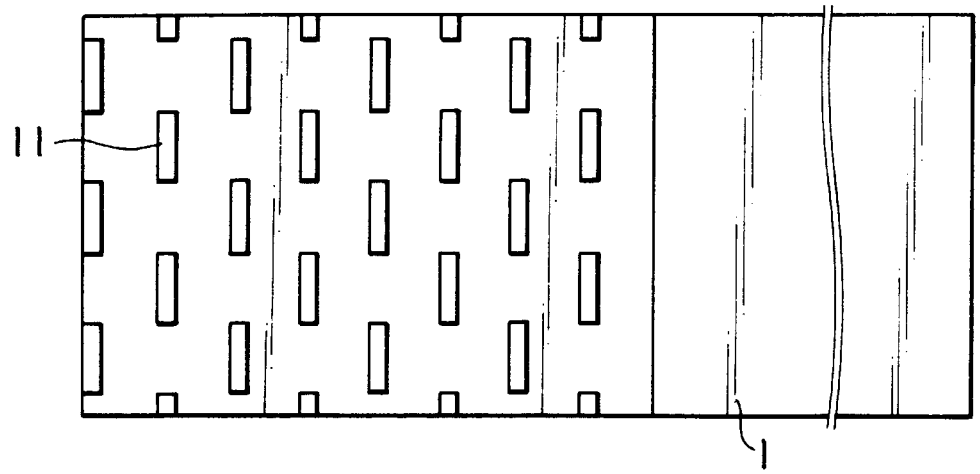
FIG. 6(a) is a bottom view of a wave-absorbing type large floating structure in accordance of a sixth embodiment of the present invention.
Figure 6B:
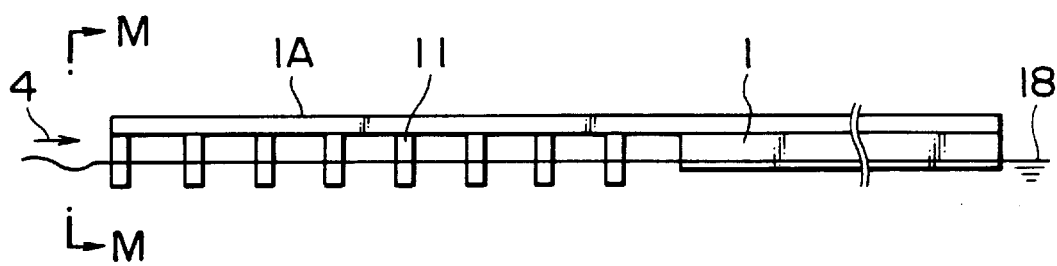
FIG. 6(b) is a side view thereof.
Figure 6C:
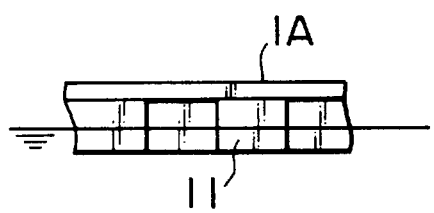
FIG. 6(c) is a view in the direction of the arrow M—M of FIG. 6(b)

FIG. 6(a) is a bottom view of a wave-absorbing type large floating structure in accordance of a sixth embodiment of the present invention, FIG. 6(b) is a side view thereof, and FIG. 6(c) is a view in the direction of the arrow M—M of FIG. 6(b).

As shown in FIGS. 6(a), 6(b), and 6(c), a wave absorbing structure for a large floating structure 1 of the sixth embodiment has a plurality of quadrangular prisms 11 provided as columnar members depending from an upper deck extending portion 1A extending to the up-wave side to a level under water by passing through a water surface 18. These quadrangular prisms 11 are arranged in a zigzag form as shown in FIG. 6(a).

Figure 7A:
FIG. 7(a) is a bottom view of a wave-absorbing type large floating structure in accordance of a seventh embodiment of the present invention.
Figure 7B:
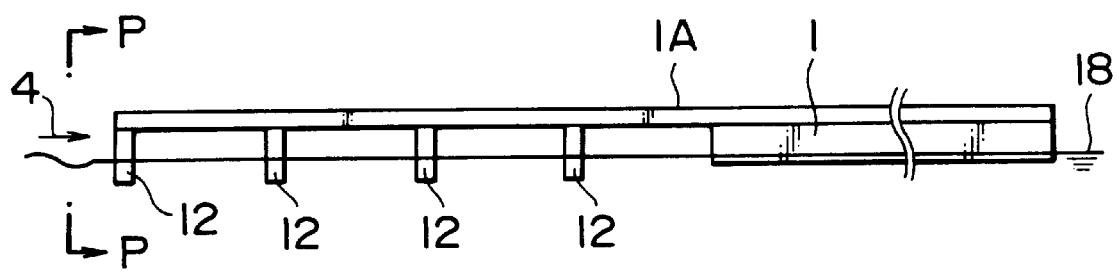
FIG. 7(b) is a side view thereof.
Figure 7C:
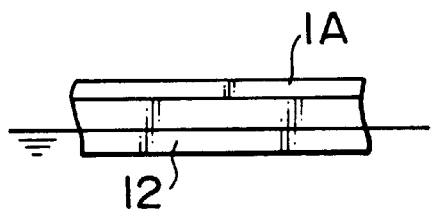
FIG. 7(c) is a view in the direction of the arrow P—P of FIG. 7(b)

FIG. 7(a) is a bottom view of a wave-absorbing type large floating structure in accordance of a seventh embodiment of the present invention, FIG. 7(b) is a side view thereof, and FIG. 7(c) is a view in the direction of the arrow P—P of FIG. 7(b).

As shown in FIGS. 7(a), 7(b), and 7(c), a wave absorbing structure for a large floating structure 1 of the seventh embodiment has a plurality of end plates 12 depending from an upper deck extending portion 1A extending to the up-wave side to a level under water by passing through a water surface 18. These end plates 12 are arranged along the advance direction of incident wave 4 with constant spaces formed therebetween longitudinally so as to be perpendicular to the advance direction of incident wave 4.

Figure 8A:
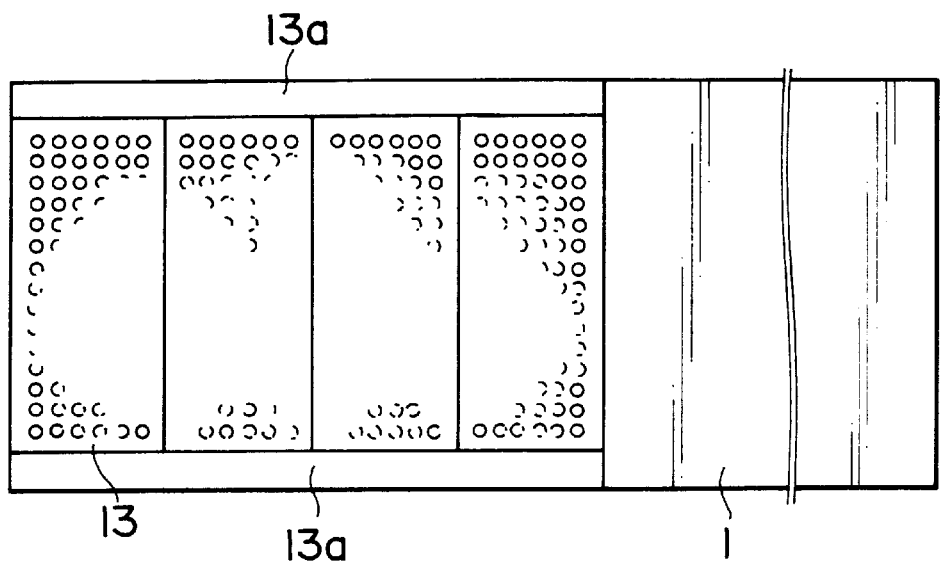
FIG. 8(a) is a bottom view of a wave-absorbing type large floating structure in accordance of an eighth embodiment of the present invention.
Figure 8B:
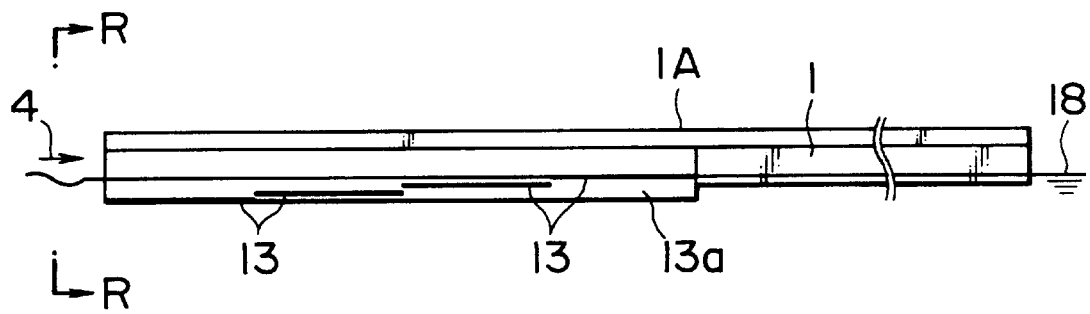
FIG. 8(b) is a longitudinal sectional view thereof.
Figure 8C:
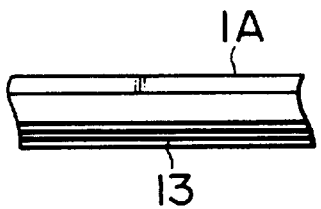
FIG. 8(c) is a view in the direction of the arrow R—R of FIG. 8(b)

FIG. 8(a) is a bottom view of a wave-absorbing type large floating structure in accordance of an eighth embodiment of the present invention, FIG. 8(b) is a longitudinal sectional view thereof, and FIG. 8(c) is a view in the direction of the arrow R—R of FIG. 8(b).

As shown in FIGS. 8(a), 8(b), and 8(c), a wave absorbing structure for a large floating structure 1 of the eighth embodiment is provided with a plurality of multistep shaped horizontal plates 13 disposed under an upper deck extending portion 1A extending to the up-wave side so that the level thereof is successively raised in the advance direction of incident wave 4 and side support members 13a extending from an upper deck extending portion 1A to a level under water by passing through a water surface 18 so as to support both sides of the horizontal plates 13.

The multistep shaped horizontal plates 13 are distributed from under the water surface to the vicinity of water surface, and each horizontal plate 13 in this embodiment uses a perforated plate.

Figure 9A:
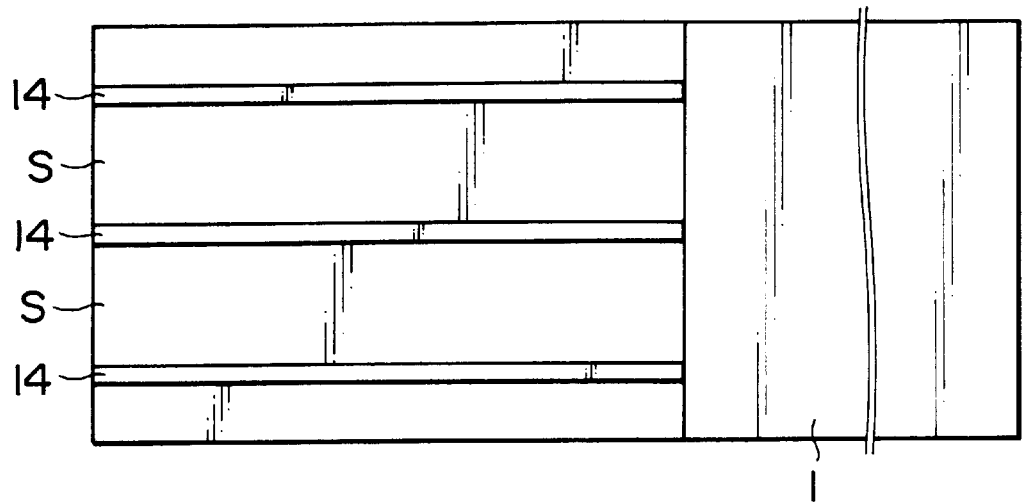
FIG. 9(a) is a bottom view of a wave-absorbing type large floating structure in accordance of a ninth embodiment of the present invention.
Figure 9B:
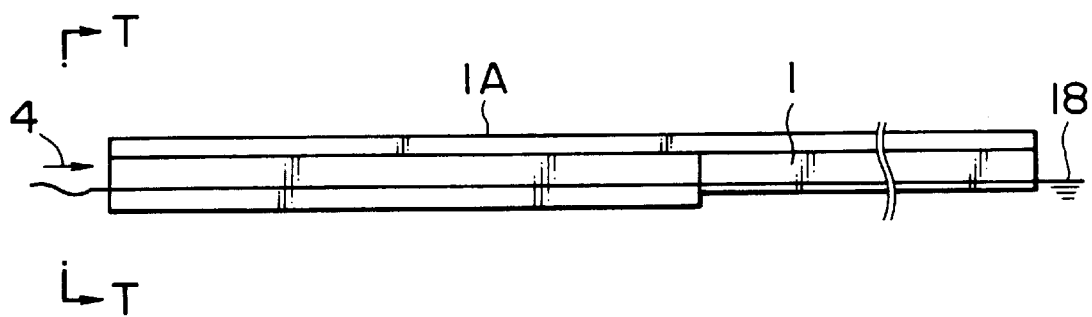
FIG. 9(b) is a side view thereof.
Figure 9C:
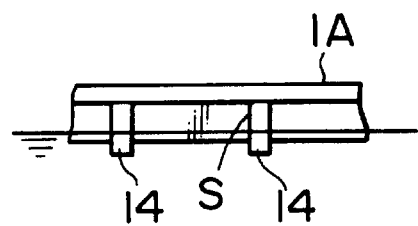
FIG. 9(c) is a view in the direction of the arrow T—T of FIG. 9(b)

FIG. 9(a) is a bottom view of a wave-absorbing type large floating structure in accordance of a ninth embodiment of the present invention, FIG. 9(b) is a side view thereof, and FIG. 9(c) is a view in the direction of the arrow T—T of FIG. 9(b).

As shown in FIGS. 9(a), 9(b), and 9(c), a wave absorbing structure for a large floating structure 1 of the ninth embodiment has a plurality of box-shaped floating bodies 14 depending from an upper deck extending portion 1A extending to the up-wave side to a level under water by passing through a water surface 18. The box-shaped floating bodies 14 extend long in the advance direction of incident wave 4 with spaces formed therebetween in the direction perpendicular to the advance direction of incident wave 4. Therefore, tunnel-shaped spaces S are formed between the long box-shaped floating bodies 14.

Figure 10A:
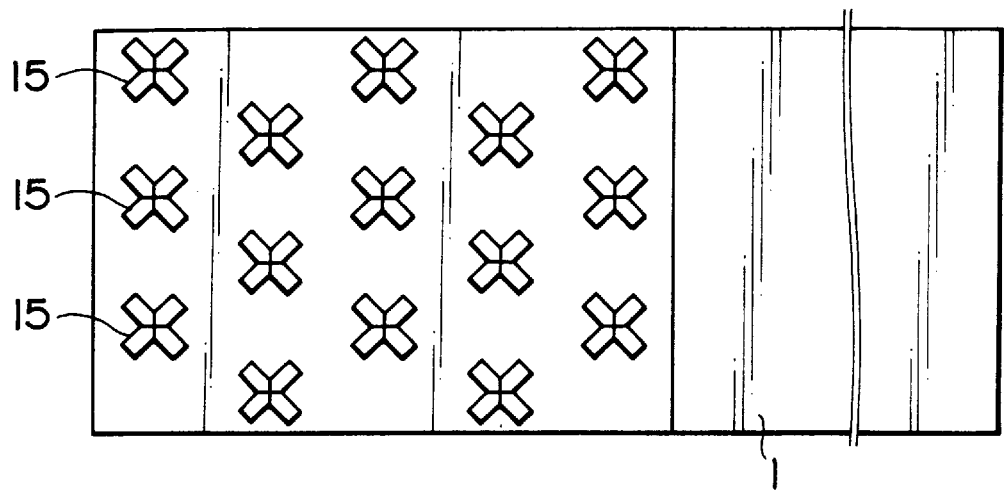
FIG. 10(a) is a bottom view of a wave-absorbing type large floating structure in accordance of a tenth embodiment of the present invention.
Figure 10B:
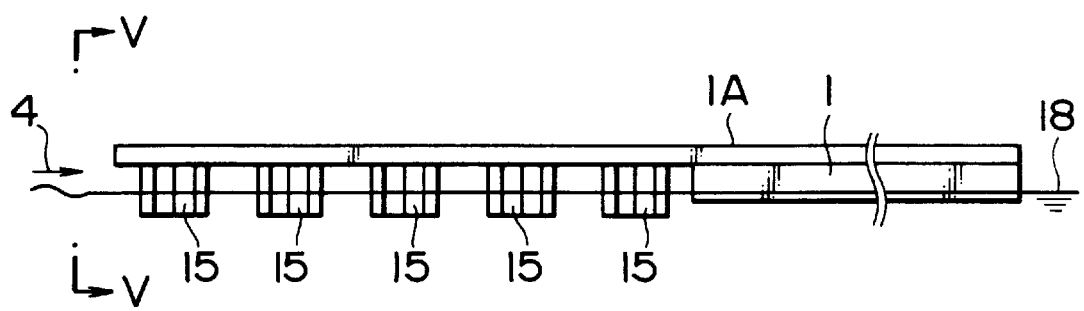
FIG. 10(b) is a side view thereof.
Figure 10C:
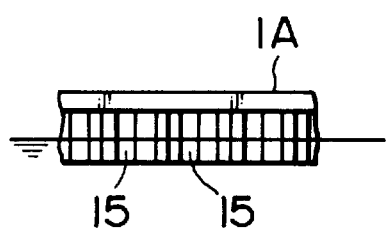
FIG. 10(c) is a view in the direction of the arrow V—V of FIG. 10(b)

FIG. 10(a) is a bottom view of a wave-absorbing type large floating structure in accordance of a tenth embodiment of the present invention, FIG. 10(b) is a side view thereof, and FIG. 10(c) is a view in the direction of the arrow V—V of FIG. 10(b).

As shown in FIGS. 10(a), 10(b), and 10(c), a wave absorbing structure for a large floating structure 1 of the tenth embodiment has a plurality of columnar members 15 depending from an upper deck extending portion 1A extending to the up-wave side to a level under water by passing through a water surface 18, which are arranged in a zigzag form. The columnar member 15 has a X-shaped cross section. The cross angle of X in this X-shaped cross section may be a right angle or any other angle.

Figure 11A:
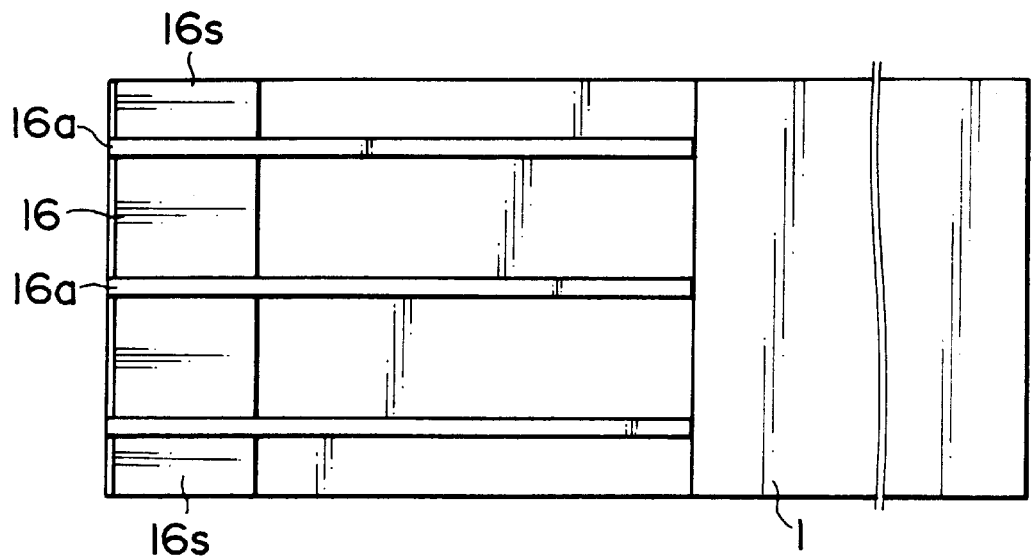
FIG. 11(a) is a bottom view of a wave-absorbing type large floating structure in accordance of an eleventh embodiment of the present invention.
Figure 11B:
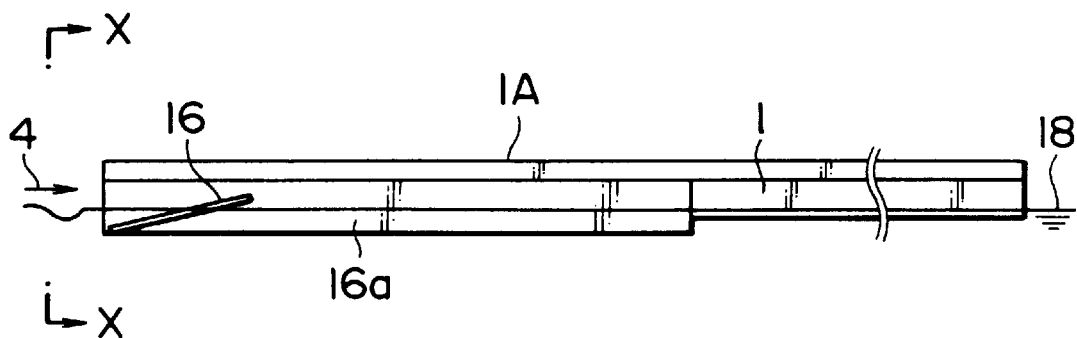
FIG. 11(b) is a longitudinal sectional view thereof.
Figure 11C:
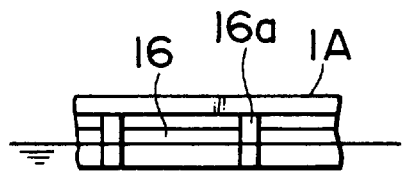
FIG. 11(c) is a view in the direction of the arrow X—X of FIG. 11(b)
Figure 13:
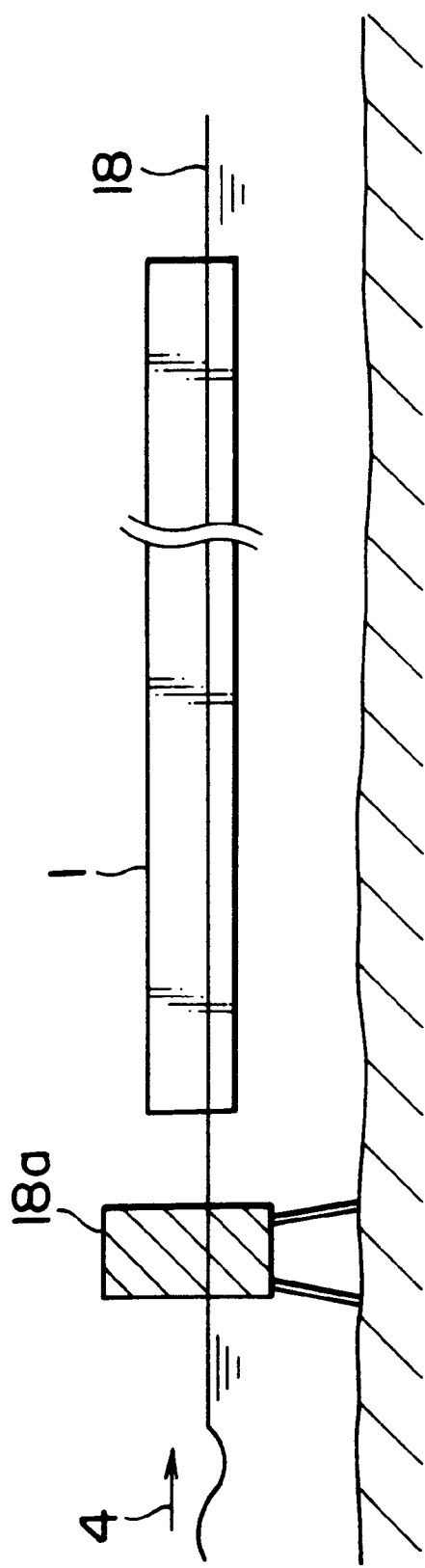
FIG. 13 is a side view showing a conventional large floating structure and a breakwater.

FIG. 11(a) is a bottom view of a wave-absorbing type large floating structure in accordance of an eleventh embodiment of the present invention, FIG. 11(b) is a longitudinal sectional view thereof, and FIG. 11(c) is a view in the direction of the arrow X—X of FIG. 11(b).

As shown in FIGS. 11(a), 11(b), and 11(c), a wave absorbing structure for a large floating structure 1 of the eleventh embodiment has a plurality of long box-shaped floating bodies 16a depending from an upper deck extending portion 1A extending to the up-wave side to a level under water by passing through a water surface 18 and inclined plates 16 installed between the up-wave portions of the adjacent box-shaped floating bodies 16a. The box-shaped floating bodies 16a are arranged in parallel in the advance direction of incident wave 4 with spaces formed therebetween. The inclined plate 16 rises gradually in the advance direction of incident wave 4. The side edge of the outermost inclined plate 16s is supported by a suitable support member.

FIG. 12(a) is a bottom view of a wave-absorbing type large floating structure in accordance of a twelfth embodiment of the present invention, FIG. 12(b) is a side view thereof, and FIG. 12(c) is a view in the direction of the arrow Z—Z of FIG. 12(b).

As shown in FIGS. 12(a), 12(b), and 12(c), a wave absorbing structure for a large floating structure 1 of the twelfth embodiment has a plurality of columnar members 17 depending from an upper deck extending portion 1A extending to the up-wave side of incident wave 4 to a level under water by passing through a water surface 18, which are arranged in a zigzag form, and footing members 17a are installed each at the lower end of columnar member 17 so as to form a lower surface larger than the horizontal cross section of the columnar member 17.

In the above-described embodiments of the present invention, a wave absorbing structure is provided under the upper deck extending portion 1A on the up-wave side of the large floating structure 1 so as to depend from the extending portion 1A to a level under the water surface 18, so that the large floating structure 1 itself has a wave absorbing function. Therefore, an expensive fixed breakwater or floating water for forming a calm sea zone is not needed.

Also, since there is no wave absorbing structure that is arranged close to the outer periphery of the upper deck and moves relatively, ship's approach is facilitated, and also the space on the upper deck including the peripheral portion thereof can be utilized effectively.

In the case where the wave absorbing structure depending from the upper deck extending portion 1A is configured as described with reference to FIG. 1, the buoyancy of many box-shaped floating bodies 2 serves as part of the buoyancy of the large floating structure 1, and also the incident waves 4 invading from the up-wave side are broken by the box-shaped floating bodies 2 and lattice-shaped connecting members 3 disposed between the box-shaped floating bodies 2, so that the wave height is decreased as the wave advances to the down-wave side.

Since the box-shaped floating boxes 2 are arranged in a zigzag form, the incident waves 4 are broken more efficiently.

For the wave-absorbing type large floating structure 1 described with reference to FIG, 9, the incident waves 4 invading from the up-wave side are damped, so that the wave height is decreased, as the incident waves 4 advance along the tunnel-shaped spaces S between the long box-shaped floating bodies 14 depending from the upper deck extending portion 1A.

In the case where the inclined plates 16 are provided between the long box-shaped floating bodies 16a, as described with reference to FIG. 11, when the incident waves 4 invading from the up-wave side advance along the spaces between the long box-shaped floating bodies 16a, the incident waves 4 are damped while rising on the inclined plates 16, so that the wave height is decreased.

When many protrusions 6 are provided on the upper surface of the inclined plate 5 as described with reference to FIG. 2, the incident waves 4 are broken by the protrusions 6 while rising along the inclined plates 5 and damped efficiently, so that the wave height is decreased.

In the case where the void forming fillers 8 are provided between the box-shaped floating bodies 2 as described with reference to FIG. 3, the incident waves 4 invading the spaces between the box-shaped floating bodies 2 are efficiently broken by the void forming fillers 8 formed of large quantities of wire nets or many wave absorbing blocks having protrusions, so that the wave energy is absorbed.

In the embodiment described with reference to FIG. 4, the incident waves 4 are broken by the T-shaped wave absorbers each consisting of the vertical plate 9A extending in the wave advance direction and the tip end extending member 9 on the up-wave side of the vertical plate. Therefore, the wave height of the incident wave 4 is decreased sufficiently before the incident wave 4 reaches the body of the large floating structure 1.

Also, in the case where the circular cylinders 10 or quadrangular prisms 11 are provided as wave absorbing structures as described with reference to FIGS. 5 and 6, the incident waves 4 are scattered by many of the cylindrical or prismatic columnar members arranged in a zigzag form, so that the wave height is decreased.

When the columnar members 15 as wave absorbing structures are formed so as to have a horizontal cross section of an X shape as described with reference to FIG. 10, the incident waves 4 are scattered more efficiently by the columnar members 15, so that the wave height is decreased significantly.

In the case where the footing member 17a is provided at the lower end of the columnar member 17 as described with reference to FIG. 12, the incident waves 4 are scattered and broken sufficiently by the cooperation of the columnar members 17 arranged in a zigzag form and the footing members 17a at the lower ends thereof, and also the effect that a floating motion can be restrained by the added mass of the footing members 17a is achieved. The columnar members 10, 11, and 15 shown in FIGS. 5, 6, and 10 can also achieve the same effect by being provided with a footing member at the lower end thereof. Further, when the wave absorbing structure is configured as described with reference to FIG. 7, the incident waves 4 invading from the up-wave side are damped while being reflected successively by the plural end plates 12, passing under the end plates 12, so that the wave height is decreased successively.

In the case where the wave absorbing structure is configured as described with reference to FIG. 8, the incident waves 4 are broken and damped by the multistep shaped horizontal plates whose level is raised successively so that the motion of wave particle is destroyed. Therefore, when the incident waves 4 reach the body of the large floating structure 1, the wave height is decreased.

When the horizontal plate 13 is formed of a perforated plate, the wave particle motion of the incident wave 4 is destroyed more efficiently, so that the wave height is decreased sufficiently.

What is claimed is:

1. A wave-absorbing type large floating structure having a large upper deck, in which an extending portion of said upper deck extending to the up-wave side is provided with a wave absorbing structure depending from said extending portion so as to extend to a level under water by passing through a water level, wherein said wave-absorbing structure is configured so that a plurality of box-shaped floating bodies depending from said upper deck extending portion are provided so as to extend long in the wave advance direction with spaces formed therebetween, and wherein inclined plates are installed between said box-shaped floating bodies so as to rise gradually in the wave advance direction, wherein many protrusions are provided on the upper surface of said inclined plate.

2. A wave-absorbing type large floating structure having a large upper deck, in which an extending portion of said upper deck extending to the up-wave side is provided with a wave-absorbing structure depending from said extending portion so as to extend to a level under water by passing through a water level, wherein said wave-absorbing structure is configured so that a plurality of box-shaped floating bodies depending from said upper deck extending portion are provided so as to extend long in the wave advance direction with spaces formed therebetween, wherein void forming fillers supported by supporting means installed to said box-shaped floating bodies are provided in the spaces between said box-shaped floating bodies.

3. A wave-absorbing type large floating structure having a large upper deck, in which an extending portion of said upper deck extending to the up-wave side is provided with a wave-absorbing structure depending from said extending portion so as to extend to a level under water by passing through a water level, wherein said wave-absorbing structure is configured so that a plurality of T-shaped wave absorbers are formed of many vertical plates depending from said upper deck extending portion so as to extend in parallel in the wave advance direction and tip end extending members each connected to the up-wave end of said vertical plate and extending to both sides of said vertical plate.

4. A wave-absorbing type large floating structure having a large upper deck, in which an extending portion of said upper deck extending to the up-wave side is provided with a wave absorbing structure depending from said extending portion so as to extend to a level under water by passing through a water level, wherein said wave absorbing structure is configured by a plurality of columnar members depending from said upper deck extending portion in a zigzag form, wherein said columnar members are formed so as to have a horizontal cross-section of an X-shape.

5. A wave-absorbing type large floating structure having a large upper deck, in which an extending portion of said upper deck extending to the up-wave side is provided with a wave absorbing structure depending from said extending portion so as to extend to a level under water by passing through a water level, wherein said wave absorbing structure is configured by a plurality of columnar members depending from said upper deck extending portion in a zigzag form, wherein a footing member forming a lower surface larger than the horizontal cross-section of said columnar member is provided at the lower end of said columnar member.

6. The wave-absorbing type large floating structure according to claim 5 wherein said columnar member is formed so as to have a horizontal cross-section of an X-shape.

\* \* \* \* \*